United States Patent [19]

Carp

[11] 3,797,894
[45] Mar. 19, 1974

[54] COMBINATION PEAK DETECTOR AND LEVEL DETECTOR FOR USE IN AN ADAPTIVE BRAKING SYSTEM

[75] Inventor: Ralph W. Carp, Newport News, Va.

[73] Assignee: The Bendix Corporation, Southfield, Mich.

[22] Filed: Jan. 24, 1973

[21] Appl. No.: 326,209

[52] U.S. Cl............ 303/21 R, 307/235 A, 328/151
[51] Int. Cl.......................................B60t 8/00
[58] Field of Search..... 188/181; 307/235 R, 235 A, 307/246; 328/115, 116, 151 303/20, 21

[56] References Cited
UNITED STATES PATENTS

| | | | |
|---|---|---|---|
| 3,654,444 | 4/1972 | Gurol | 328/151 X |
| 3,666,326 | 5/1972 | Marouby | 303/21 BE |
| 3,699,357 | 10/1972 | Lloyd | 307/246 X |
| 3,714,464 | 1/1973 | Nutt | 328/116 X |
| 3,743,950 | 7/1973 | Sellari, Jr. et al | 328/151 |

Primary Examiner—Trygve M. Blix
Assistant Examiner—Stephen G. Kunin

[57] ABSTRACT

A peak detector for use in an adaptive braking system includes a current source which supplies current to a memory capacitor to maintain the voltage thereacross equal to an input signal so long as the input signal remains above a first threshold. While the input signal is decreasing below the first threshold, current is drawn from the memory capacitor so that the voltage thereacross continues to track the input voltage. However, when the input signal subsequently begins to increase below the first threshold, diodes prevent current from entering or being drawn from the memory capacitor so that the voltage across the capacitor remains constant and equal to the negative peak value of the input signal. The voltage across the capacitor is applied as one input to a comparator while only a portion of the input signal voltage is applied as the second input to the comparator. Accordingly, when the input signal voltage increases by an amount related to the above mentioned portion the comparator generates an output.

11 Claims, 4 Drawing Figures

COMBINATION PEAK DETECTOR AND LEVEL DETECTOR FOR USE IN AN ADAPTIVE BRAKING SYSTEM

BACKGROUND OF THE INVENTION

This invention relates to an electrical peak detector of the type particularly adapted for use in an adaptive braking system for automotive vehicles, trucks and the like, and more particularly to a peak detector whose output characteristics are essentially independent of the input signal frequency and additionally includes a level detector generating an output when an input signal attains a predetermined level.

Various types of adaptive braking systems for wheeled vehicles are known. These include systems wherein the acceleration and deceleration of the wheels is sensed and after the brakes have been applied by the operator during the desired stop, wheel braking pressure is automatically relieved when certain changes in the acceleration and deceleration of the wheels occur. In other systems wheel speed may be determined and wheel braking pressure automatically relieved when certain wheel speed criteria have been satisfied. For example, the wheel braking pressure may be relieved if the wheel decelerates during braking at a rate greater than a preset optimum rate. The occurrence of these dynamic wheel conditions generally indicates that wheel lock up, with resultant deterioration of vehicle braking characteristics, is imminent. The automatic release of the brakes prevents wheel lock up and tire skidding and allows the wheel to continue to rotate during vehicle braking for more efficient brake operation. Of course, it is necessary that once the wheel braking pressure has been relieved, to reapply the braking pressure automatically once it is determined such action is desirable from the standpoint of bringing the vehicle to a safe controlled stop. Certain adaptive braking systems provide excellent vehicle braking characteristics if the braking pressure is reapplied during a controlled stop after a fixed change in wheel acceleration after the wheel acceleration peak has occured. The vehicle will operate under various operational and environmental conditions ranging from conditions where the vehicle is braked on ice so that the frictional coefficient at the tire-road interface is very low and ranging to conditions where the vehicle is braked on dry road surfaces where the tire-road interface frictional coefficient is very high. Under these various conditions the wheel acceleration peak after the brakes have been automatically released could be very shallow or very high, depending on the tire-road interface frictional coefficient. It has been determined that for optimum braking where the wheel acceleration peak is shallow wheel brake pressure should be reapplied as mentioned above, that is, after a change in wheel acceleration after the wheel acceleration peak. However, in situations where the wheel acceleration goes above a predetermined level but has not yet attained a peak, it has been found desirable to begin reapplication of the brakes at that predetermined level, the failure to attain a wheel peak acceleration not withstanding.

Since the rate at which the wheel accelerates after the brake has been released varies, depending upon the characteristics of the tire-road interface, it is important that the peak detector be relatively insensitive to the frequency of the applied signal.

SUMMARY OF THE INVENTION

A peak detector circuit suitable for use in an adaptive braking system and which meets the criteria outlined above is comprised of three operational amplifiers. The first of these amplifiers operates as a comparator receiving as one input the signal whose peak is to be determined, this input signal being proportional to wheel acceleration (including wheel deceleration) and receives as a second input a reference voltage indicative of zero wheel acceleration. The input signal is characteristically derived from means for sensing the dynamic performance of a vehicle wheel or group of wheels. These means are well known to those skilled in the art. The input signal suitably is a d-c electrical signal having a varying level which is correlated to sensed wheel acceleration. The rate of change in the d-c voltage level of the input signal as the acceleration of the sensed wheel changes is herein termed the signal frequency. This operational amplifier operates as a current supply for a memory so long as the wheel is decelerating but the current is turned off whenever the wheel is accelerating.

The memory is comprised of a capacitor and a second operational amplifier having a diode in its feedback circuit. The second operational amplifier receives the input signal as a first input and receives the voltage impressed across the capacitor as a second input. In this manner the capacitor receives current from the current supply and thereby tracks the input signal so long as the wheel is decelerating and will subsequently track the input signal by having current withdrawn therefrom through the feedback diode so long as the wheel continues to accelerate but does not reach an acceleration peak. However, once the input signal attains a peak and subsequently moves in the opposite direction the memory capacitor can track it only by having current added thereto. However, the feedback diode is now back-biased so that current cannot pass therethrough and the current supply is still turned off since the wheel is still accelerating. Thus, the voltage across the memory capacitor can no longer track the input signal and thus remains constant. This voltage is sensed at one input of a third operational amplifier connected as a comparator. The second input to this comparator is derived from a constant current source circuit which maintains the voltage level of the second input a fixed amount below the input signal. When the input signal changes by this fixed amount after its acceleration peak the comparator generates an output signal which can be used to reapply braking force.

The aforementioned constant current source includes a transistor which normally draws constant current through a resistor to maintain the fixed offset from the input signal. In cases where the input signal indicates that high wheel acceleration is occurring, the constant current source will saturate its transistor at a predetermined level which may be prior to the acceleration peak. The previously fixed offset from the input signal will now no longer remain fixed but will decrease so that the second input to the comparator will approach the value of the input signal. Since the acceleration peak has not yet been reached the first input to the comparator will still be tracking the input signal with the result that the comparator will generate its output signal immediately after the transistor becomes saturated.

Since the discharge path of the memory capacitor is through diodes or into the input terminals of operational amplifiers, which input terminals are characterized by their high input impedance, it can be seen that once the diodes in the discharge path become back-biased only insignificant current can leak from the memory capacitor. Accordingly, only a very small capacitor need be used for the memory to accomplish the purposes of the invention. It is well known that a small capacitor will closely follow changes in an input frequency signal so that the circuit of the invention will be relatively independent of the input signal frequency.

It is thus an object of this invention to provide a peak detector which will generate an output when a fixed offset after the peak of an input signal has occurred.

It is another object of this invention to provide a peak detector of the type described above which will generate its output signal if the input signal attains a predetermined threshold regardless of whether a peak has occurred.

A further object of this invention is to provide a peak detector of the type described which is relatively independent of the frequency of the input signal.

One more object of this invention is to provide a peak detector particularly adapted for use in an adaptive braking system.

These and other objects of the invention will be made apparent by reading of the following description of the preferred embodiment and appended claims.

BRIEF DESCRIPTION OF THE DRAWINGS

FIG. 2 illustrates operation where the input signal attains an acceleration peak which is below a predetermined threshold, while FIG. 3 illustrates operation where the input signal exceeds the predetermined threshold.

DESCRIPTION OF THE PREFERRED EMBODIMENT

Figure 1:
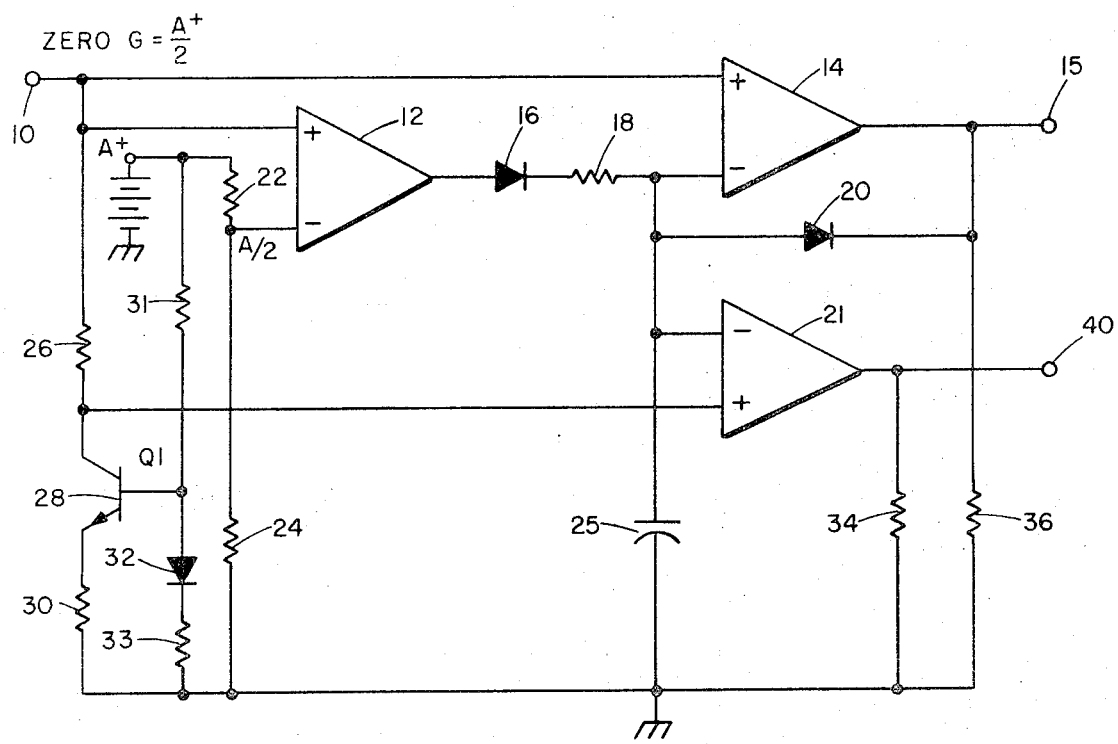
FIG. 1 is a modified schematic of one embodiment of the invention.

In the drawings the elements are poled for detecting the negative peak of a varying electrical signal and thus this form of the invention is particularly adapted for use in an adaptive braking system where a negative peak of the wheel acceleration signal corresponds to peak in acceleration of the wheel. It will be obvious to one skilled in the art after reading of this description of the preferred embodiment how to adapt the circuit shown for use in detecting the positive peaks of electrical signal if such is desired. Referring now to FIG. 1, there is seen an input terminal 10 which is connected to receive the wheel acceleration signal (input signal) from an adaptive braking system control channel (not shown). The wheel acceleration signal is voltage biased by means known to those skilled in the art so that zero acceleration is indicated by a voltage level equal to A+/2, where A+ is the available positive voltage level and where voltage levels of the wheel acceleration signal, or input signal, above A+/2 indicate a decelerating sensed wheel and where voltage levels of the input signal below A+/2 indicate an accelerating sensed wheel. Input terminal 10 is connected to apply the input signal to the non-inverting input terminals of operational amplifiers 12 and 14.

An A+ power supply voltage is connected across resistors 22 and 24. In this embodiment the resistance of resistor 22 is equal to the resistance of resistor 24 and the junction between these two resistors is connected to the inverting input terminal of operational amplifier 12. This constitutes a reference voltage level which is, of course, equal to A+/2 which corresponds to an input signal of zero acceleration. Operational amplifier 12 is operated open looped as a comparator which acts as a current source so long as the voltage level of the input signal at its non-inverting input terminal is higher than the voltage level at its inverting input terminal. That is, so long as the input signal indicates that the sensed wheel is decelerating, operational amplifier 12 will supply current which is applied through diode 16 and resistor 18 to one plate of capacitor 25, whose other plate is connected to ground (the return terminal of the aforementioned A+ power supply). The first plate of capacitor 25 is also connected to the inverting input terminals of operational amplifiers 14 and 21. A diode 20 is connected in feedback relationship between the inverting input terminal of operational amplifier 14 and its output terminal. Thus, so long as the input signal indicates that the sensed wheel is decelerating so that current is supplied to capacitor 25 from operational amplifier 12 or so long as the input signal is decreasing so that current can be drawn from capacitor 25 through diode 20 and resistor 36 to ground, the voltage across capacitor 25 will track the input signal. In addition, the voltage at the output terminal of operational amplifier 14 will also track the input signal (less the voltage drop across diode 20).

Input terminal 10 is also connected, in succession, through resistor 26, the collector-emitter circuit of NPN transistor 28 and resistor 30 to ground. The A+ voltage source is also connected across, in succession, resistor 31, diode 32 and resistor 33. The base electrode of transistor 28 is connected to the junction of resistor 31 with diode 32. It can be seen that transistor 28 is connected as a constant current sink for resistor 26. Thus, the voltage at the collector electrode of transistor 28 will remain at a constant fixed voltage below the level of the input signal due to the constant current flow through, and hence the constant voltage drop across, resistor 26. The collector-electrode of transistor 28 is connected directly to the non-inverting input terminal of operational amplifier 21.

Figure 2:
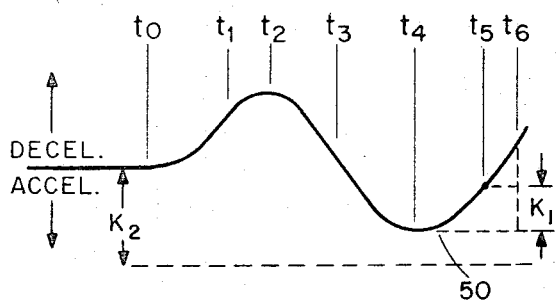
FIGS. 2 and 3 are curves which illustrate the operation of an adaptive braking system which includes the invention.

Assume now that a vehicle having an adaptive braking system incorporating the circuit of the invention is moving at a constant speed so that the input signal of terminal 10 corresponds to a zero acceleration signal of the sensed wheel. This corresponds to time prior to $t_0$ of FIG. 2, reference to which figure should also be made. The curve of this figure illustrates the input signal. Assume now the brakes are applied at time $t_0$ in such a manner that skidding is imminent and the adaptive braking system operates to automatically control the braking cycle. Immediately after time $t_0$ the wheels will begin to decelerate as indicated in FIG. 2 and the adaptive braking system will subsequently operate to relieve the braking pressure, for example at time $t_1$. During the time between $t_0$ and $t_1$ operational amplifier 12 will operate to supply current to memory capacitor 25 thereby causing the voltage across the capacitor to track the wheel acceleration signal, that is, the signal at the non-inverting input terminal of operational amplifier 14 which is the input signal at terminal 10. The wheels reach a deceleration peak at time $t_2$ and thereafter the deceleration signal will decrease between time $t_2$ and $t_3$. During this time current will be available from operational amplifier 12 but since the input signal voltage is decreasing no current is required from operational amplifier 12, but current will leak from memory capacitor 25 through diode 20 and resistor 36 to ground so that the memory capacitor continues to track the input signal. Between time $t_3$ and $t_4$ the wheel is accelerating so that the current source comprised of operational amplifier 12 turns off. However, since the input signal continues to decrease over this period the voltage across the memory capacitor can continue to track the input signal by leaking current through diode 20 and resistor 36.

Subsequent to time $t_4$ which is that time immediately after the input signal passes through its acceleration peak, memory capacitor 25 will require current be supplied thereto in order to track the input signal. However, since during this time, the current supply of operational amplifier 12 is turned off and current cannot be supplied through diode 20 into capacitor 25, the voltage across this capacitor will remain constant and will generally follow the horizontal dashed line 50 of FIG. 2. At time $t_5$ the input signal will have increased so that it will be offset from the voltage across capacitor 25 by an amount $K_1$, where $K_1$ is the aforementioned constant voltage drop across resistor 26 of FIG. 1. At that time, operational amplifier 21 will generate an output which will be impressed across resistor 34 and will be available at terminal 40 for utilization to reapply the braking force. The curve of FIG. 2 will thus continue upward at least until time $t_6$ where the sensed wheel will once again begin to decelerate. At that time, operational amplifier 12 will again function as a current source to supply current to memory capacitor 25 so that it once again will track the input signal.

Note that at the time immediately subsequent to time $t_4$, since the voltage across capacitor 25 can no longer follow the input signal, the output from operational amplifier 14 will change state, switching to full positive. This change of state signal can be used to detect the peak of the input signal (within the capability of the exact operational amplifier used) and is available at terminal 15 if desired for utilization.

Figure 3:
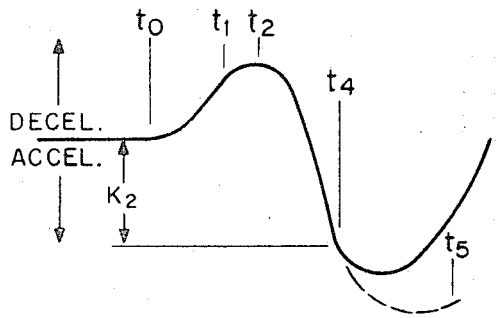

Refer now to FIG. 3, where the curve illustrates the input signal, together with FIG. 1. As before it is assumed that prior to time $t_0$ the vehicle, which includes an adaptive braking system having the circuit of the present invention, is moving at a constant speed and the brakes are applied at time $t_0$. The sensed wheel thereafter decelerates between $t_0$ and $t_1$, at which later time it is assumed that the adaptive braking system acts to relieve the braking pressure. At time $t_2$ the sensed wheel attains a deceleration peak. Of course, during the time between time $t_0$ and time $t_2$ memory capacitor 25 has tracked the input signal due to the current supplied from operational amplifier 12. Between time $t_2$ and $t_4$ the memory capacitor continues to track the input signal since current leaks therefrom through diode 20 and resistor 36. At time $t_4$ the sensed wheel is assumed to have attained an acceleration threshold $K_2$, while it is assumed that in the example of FIG. 2 the sensed wheel never attained this $K_2$ acceleration threshold. In the circuit of FIG. 1, resistor 30 is chosen so that transistor 28 becomes saturated at the desired $K_2$ threshold. When transistor 28 becomes saturated the voltage drop across resistor 26 decreases so that operational amplifier 21 generates its output at that time. This occurs at time $t_4$ of FIG. 3, at which time the circuit operates to relieve the braking pressure. Of course, without the $K_2$ threshold the wheel would have continued to accelerate along the dashed curve of FIG. 3 so that the braking pressure would not be relieved until time $t_5$, for example, a time which is subsequent to the acceleration peak.

If the adaptive braking system used with the invention operates to produce an input signal having voltage levels below a base voltage level (in the preceeding embodiment the base voltage level is A+/2) for conditions of sensed wheel deceleration and voltage levels above the base voltage level for conditions of sensed wheel accelerations, that is, where the acceleration peak corresponds to a positive peak of the input signal, the circuit of FIG. 1 can be simply modified. In this case, diodes 16 and 20 should be reversed and a PNP transistor used in place of transistor 28 as a current source from the positive supply line. With this latter configuration comparator 21 will normally supply a positive voltage and switch negative to provide an indication that the acceleration or offset therefrom or the predetermined threshold has been attained.

Figure 4:
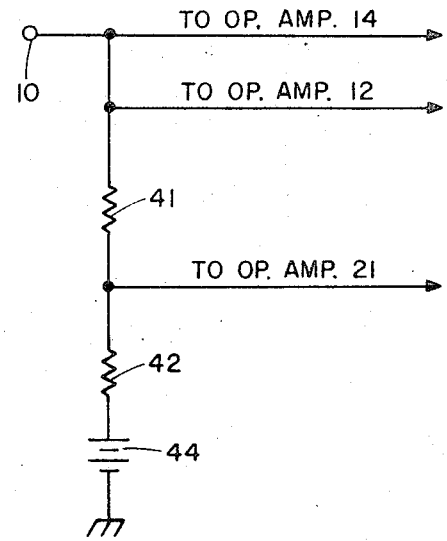
FIG. 4 illustrates another form of the invention.

The circuit of FIG. 1 illustrates a circuit where offset $K_1$ is a fixed amount. In certain applications of the invention it may be desired to make $K_1$ a percentage of the input signal at terminal 10. This can be simply accomplished by omitting the constant current supply of FIG. 1, which is comprised of transistor 28, resistors 31 and 33 and diode 32, together with resistors 26 and 30 and substituting therefor a simple resistance bridge having one end connected to terminal 10 and the other end referenced to a low impedance bias point related to $K_2$. This type of circuit is seen at FIG. 4 where the same reference numerals refer to like elements in FIG. 1. Refer now to FIG. 4 where a resistance bridge comprised of resistors 41 and 42 is connected between terminal 10 and a low impedance bias represented as battery 44. Terminal 10, as before, is connected to the non-inverting input terminals of operational amplifiers 12 and 14. The junction between resistors 41 and 42 is connected to the non-inverting input terminal of operational amplifier 21. The voltage represented by battery 44 is related to $K_2$ and is generally equal, in this embodiment, to the voltage level of the input signal at zero G less $K_2$. In this case, if the input signal at terminal 10 falls by $K_2$, there is no voltage across the resistance bridge and the voltage at the junction of resistors 41 and 42 becomes equal to the input signal voltage at terminal 10 so that operational amplifier 21 generates an output. Of course, if the input signal at terminal 10 attains a negative peak before dropping by $K_2$, the operation of the circuit is as illustrated by the curve of FIG. 2.

It should also be realized that operational amplifiers are available which operate as current sources but cannot operate as current sinks. When this type of operational amplifier is used diode 16 is unnecessary. If the circuit of opposite polarity is to be used than an operational amplifier which can operate as a current sink but cannot operate as a current source is preferable so that for this latter circuit diode 16 can also be eliminated. In any event, operational amplifier 12 either moves charges into or out of capacitor 25 depending upon which polarity circuit is used. These and other alterations and modifications of my invention should now be obvious to ones skilled in the art. Therefore, I claim that subject matter and obvious modifications thereof encompassed by the true scope and spirit of the sppended claims.

The invention claimed is:

1. In an adaptive braking system which operates to produce an electrical signal correlated to the performance of a wheeled vehicle, said electrical signal having a voltage level above a base level when correlated to the performance of a decelerating vehicle wheel, and below the base level when correlated to the performance of a vehicle accelerating wheel, and which acts to relieve vehicle braking force when certain vehicle performance criteria are attained and further acts to generate an output signal which is applied to restore braking force when said electrical signal reaches a pre-determined threshold while moving away from said base level or when said electrical signal attains a peak level less than said pre-determined threshold and subsequently moves toward said base level by a second predetermined amount, a circuit for generating said output signal in response to said electrical signal, comprising:

first means for producing a voltage level essentially equal to said base voltage level;
a capacitor;
a first unidirectional current device;
a first operational amplifier operated open looped and having first and second input terminals and an output terminal, said first means being connected to apply said voltage level to said first input terminal and said adaptive braking system being connected to apply said electrical signal to said second input terminal;
a second operational amplifier having first and second input terminals and an output terminal, said second operational amplifier first input terminal being connected to receive said electrical signal, and said unidirectional current device being connected between said first operational amplifier output terminal and said second operational amplifier second input terminal;
a second unidirectional current device connected between said second operational amplifier output and second input terminals;
a resistor;
a reference voltage level bus;
a constant current device serially connected to said resistor to form a second circuit having one end connected to receive said electrical signal and another end connected to said reference voltage level bus;
a third operational amplifier operated open looped and having a first input terminal connected to the junction between said resistor and said constant current device, a second input terminal connected to said second operational amplifier second input terminal, one plate of said capacitor being connected to the common connection thereof and the second plate of said capacitor being connected to said bus, and an output terminal upon which said output signal appears; and,
resistance means connected between said second operational amplifier output terminal and said bus.

2. The circuit of claim 1 wherein said first input terminals are non-inverting input terminals and said second terminals are inverting input terminals.

3. The circuit recited in claim 2 wherein said first and third operational amplifiers are connected as comparators.

4. The circuit of claim 1 wherein said constant current device includes an NPN transistor connected to pass constant current in its collector-emitter circuit, and wherein said resistor is connected in said collector-emitter circuit, and said first unidirectional current means is connected to deliver current from the output terminal of said first operational amplifier to the first plate of said capacitor and wherein said second unidirectional current device is connected to leak current from the first plate of said capacitor.

5. The circuit of claim 4 wherein said first and second unidirectional current devices comprise first and second diodes respectively.

6. In an adaptive braking system which operates to produce an electrical signal correlated to the acceleration and deceleration of a sensed vehicle wheel, said electrical signal having a voltage level of one sense with respect to a base level when the sensed wheel is decelerating, and of opposite sense with respect to the base level when the sensed wheel is accelerating, and which acts to release vehicle braking force when certain vehicle performance criteria are attained and further acts to generate an output signal which is applied to restore braking force when said electrical signal reaches a pre-determined threshold while moving away from said base level or when said electrical signal attains a peak level less than said predetermined threshold and then subsequently moves towards the base level by a predetermined amount, a circuit for generating said output signal in response to said electrical signal, comprising:

first means for producing a reference voltage level;
charge storage means;
operational amplifier means having first and second input terminals and an output terminal, said first input terminal being connected to receive said electrical signal;
unidirectional current means connected between said second input terminal and said output terminal;
first means responsive to said electrical signal and said reference voltage level for moving charges to said first input terminal while said electrical signal is displaced in a first direction from said reference voltage level and moving away therefrom, said charge storage means being connected to said second input terminal;
means responsive to said electrical signal for generating a second electrical signal which is offset from said electrical signal and including means for decreasing the offset when said electrical signal attains a predetermined threshold; and,
comparator means responsive to said second electrical signal and the voltage level at said second input terminal for generating said output signal.

7. The circuit of claim 6 wherein said reference voltage level is essentially equal to said base level.

8. The circuit of claim 6 wherein said means for generating a second electrical signal comprises an additional circuit having said electrical signal impressed thereacross and comprising:

a constant current source designed to saturate when said electrical signal attains said predetermined threshold; and, means responsive to the current flowing through said constant current source for generating said second electrical signal.

9. The circuit of claim 6 wherein said means for generating a second electrical signal comprises an additional circuit having said electrical signal impressed thereacross and comprising:

a voltage source having a low impedance bias point; and, a voltage divider serially connected with said voltage source and having one end connected to said bias point, said second electrical signal being generated at a point in said voltage divider.

10. The circuit of claim 6 wherein said first and second means comprise first additional and second additional operational amplifiers respectively, said first and second additional operational amplifiers being operated open looped as comparators.

11. The circuit of claim 10 wherein said charge storage means comprises a capacitor having one plate connected to said first input terminal and including resistance means connected between said operational amplifier means output terminal and said capacitor second plate.

* * * * *